(12) United States Patent  (10) Patent No.: US 8,270,680 B2
Manabe et al.  (45) Date of Patent: Sep. 18, 2012

(54) BODY PART GUIDANCE CONTROL METHOD FOR NON-CONTACT BIOMETRICS AUTHENTICATION DEVICE AND NON-CONTACT BIOMETRICS AUTHENTICATION DEVICE

(75) Inventors: Michitaro Manabe, Inagi (JP); Hiroyuki Takamatsu, Inagi (JP); Shinichi Eguchi, Inagi (JP); Kazuhiro Komura, Inagi (JP); Takayuki Maeta, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 908 days.

(21) Appl. No.: 12/274,573

(22) Filed: Nov. 20, 2008

(65) Prior Publication Data

US 2009/0245585 A1 Oct. 1, 2009

(30) Foreign Application Priority Data

Mar. 31, 2008 (JP) .................................. 2008-90560

(51) Int. Cl.
*G06K 9/00* (2006.01)
(52) U.S. Cl. ........................................ 382/115; 382/124
(58) Field of Classification Search ............... 348/14.16, 348/94, 95, 116, 78, 218, 333.03, 135, 340, 348/344, 51; 382/117, 115, 107, 124
See application file for complete search history.

(56) References Cited

U.S. PATENT DOCUMENTS

| | | | |
|---|---|---|---|
| 6,993,160 B2* | 1/2006 | Miura et al. | 382/115 |
| 7,271,839 B2* | 9/2007 | Lee et al. | 348/346 |
| 7,280,676 B2* | 10/2007 | Miura et al. | 382/115 |
| 7,599,523 B2* | 10/2009 | Miura et al. | 382/115 |
| 7,627,145 B2* | 12/2009 | Miura et al. | 382/115 |
| 8,009,875 B2* | 8/2011 | Miura et al. | 382/115 |
| 2002/0130961 A1 | 9/2002 | Lee et al. | |
| 2002/0141622 A1* | 10/2002 | Yamaguchi | 382/126 |
| 2004/0022421 A1* | 2/2004 | Endoh et al. | 382/115 |

(Continued)

FOREIGN PATENT DOCUMENTS

EP 1645989 A2 4/2006

(Continued)

OTHER PUBLICATIONS

European Search Report dated Sep. 3, 2009, issued in corresponding European Patent Application No. 09150048.8.

(Continued)

*Primary Examiner* — Vu Le
*Assistant Examiner* — Andrae S Allison
(74) *Attorney, Agent, or Firm* — Westerman, Hattori, Daniels & Adrian, LLP

(57) ABSTRACT

A body part guidance control is performed in a non-contact biometrics authentication device which performs individual authentication utilizing characteristics of a body part which is a portion of a human body, for guiding the body part so as to capture images without contact. The future position at the time of message display is predicted by using body part positions of n times in the past and the guidance message can be selected according to this predicted position to output an appropriate message. Hence the time for guidance into an appropriate image capture region can be shortened, the output of messages for movement in the direction opposite the body part movement can be prevented, and inducement of confusion in the user can be prevented, so that the speed of authentication can be improved.

16 Claims, 15 Drawing Sheets

U.S. PATENT DOCUMENTS

| | | |
|---|---|---|
| 2004/0211501 A1 | 10/2004 | Kajita |
| 2005/0148876 A1* | 7/2005 | Endoh et al. ............ 600/454 |
| 2006/0023919 A1* | 2/2006 | Okamura et al. ............ 382/115 |
| 2008/0063244 A1 | 3/2008 | Tanaka et al. |

FOREIGN PATENT DOCUMENTS

| | | |
|---|---|---|
| EP | 1903509 A1 | 3/2008 |
| JP | 2004-062826 A | 2/2004 |
| JP | 2004-224270 A | 8/2004 |
| JP | 2005-316683 A | 11/2005 |
| JP | 2006-42880 A | 2/2006 |
| JP | 2008-71030 A | 3/2008 |
| WO | 2004/021884 A1 | 3/2004 |
| WO | 2005/106774 A2 | 11/2005 |

OTHER PUBLICATIONS

Korean Office Action dated Sep. 29, 2010, issued in corresponding Korean Patent Application No. 10-2008-0124508.

European Office Action dated Aug. 30, 2010, issued in corresponding European Patent Application No. 09 150 048.8.

Japanese Office Action dated May 15, 2012, issued in corresponding application No. 2008-090560, with English translation.

* cited by examiner

FIG.7
POSITION INFORMATION TABLE 32-1

|   | MEANING | UNITS | 1 | 2 | 3 | 4 | 5 |
|---|---|---|---|---|---|---|---|
| z | HEIGHT | mm | 65 | 75 | 70 | | |
| x | LEFT-RIGHT POSITION | mm | 90 | 160 | 90 | | |
| y | DEPTH-DIRECTION POSITION | mm | 105 | 105 | 105 | | |
| α | INCLINATION (X AXIS) | ° | 40 | 40 | 45 | | |
| β | INCLINATION (Y AXIS) | ° | 35 | 35 | 35 | | |
| γ | INCLINATION (Z AXIS) | ° | 60 | 55 | 50 | | |

FIG.8
TRANSITION STATE TABLE (VELOCITY) 32-2

|   | UNITS | 1 | 2 | 3 | 4 | 5 |
|---|---|---|---|---|---|---|
| Vz | (*100)mm/ms | | 5 ※1 | -3 | | |
| Vx | (*100)mm/ms | | 35 | -35 | | |
| Vy | (*100)mm/ms | | 0 | 0 | | |
| Vα | (*100)°/ms | | 0 | 3 | | |
| Vβ | (*100)°/ms | | 0 | 0 | | |
| Vγ | (*100)°/ms | | -3 | -3 | | |

※1:( 75mm - 65mm ) / 200ms

FIG.9
TRANSITION STATE TABLE (ACCELERATION) 32-3

|   | UNITS | 1 | 2 | 3 | 4 | 5 |
|---|---|---|---|---|---|---|
| Az | (*10000)mm/ms*ms | | | 4 ※2 | | |
| Ax | (*10000)mm/ms*ms | | | 35 | | |
| Ay | (*10000)mm/ms*ms | | | 0 | | |
| Aα | (*10000)°/ms | | | -2 | | |
| Aβ | (*10000)°/ms | | | 0 | | |
| Aγ | (*10000)°/ms | | | 0 | | |

※2:( 0.05mm/ms - ( -0.03mm/ms ) ) / 200ms

FIG.10
POSITION INFORMATION PREDICTION TABLE — 32-4

| | UNITS | PREDICTED POSITION AFTER 100 ms | PREDICTION PRECISION |
|---|---|---|---|
| Fz | mm | 67 ※3 | |
| Fx | mm | 55 | |
| Fy | mm | 105 | |
| Fα | ° | 48 | |
| Fβ | ° | 35 | |
| Fγ | ° | 47 | |

※3: 70mm + (-0.03mm/ms) * 100ms

FIG.11
PREDICTION PRECISION JUDGMENT TABLE — 32-5

| | UNITS | HIGH PRECISION | INTERMEDIATE PRECISION | LOW PRECISION |
|---|---|---|---|---|
| Az | (*10000)mm/ms*ms | 0~5 | 6~30 | 31~ |
| Ax | (*10000)mm/ms*ms | 0~5 | 6~30 | 31~ |
| Ay | (*10000)mm/ms*ms | 0~5 | 6~30 | 31~ |
| Aα | (*10000)°/ms | 0~3 | 4~10 | 11~ |
| Aβ | (*10000)°/ms | 0~3 | 4~10 | 11~ |
| Aγ | (*10000)°/ms | 0~3 | 4~10 | 11~ |

FIG.12 POSITION INFORMATION PREDICTION TABLE

| | UNITS | PREDICTED POSITION AFTER 100 ms | PREDICTION PRECISION |
|---|---|---|---|
| Fz | mm | 67 | HIGH |
| Fx | mm | 55 | LOW |
| Fy | mm | 105 | HIGH |
| Fα | ° | 48 | HIGH |
| Fβ | ° | 35 | HIGH |
| Fγ | ° | 47 | HIGH |

32-4

FIG.13 STATIONARY JUDGMENT TABLE

| | UNITS | STATIONARY STATE | NON-STATIONARY STATE |
|---|---|---|---|
| Az | (*10000)mm/ms*ms | 0~20 | 31~ |
| Ax | (*10000)mm/ms*ms | 0~20 | 31~ |
| Ay | (*10000)mm/ms*ms | 0~20 | 31~ |
| Aα | (*10000)°/ms | 0~10 | 11~ |
| Aβ | (*10000)°/ms | 0~10 | 11~ |
| Aγ | (*10000)°/ms | 0~10 | 11~ |

OUTPUT INFORMATION DECISION TABLE 32-7

| STATIONARY JUDGMENT RESULT | PREDICTED POSITION | PREDICTION PRECISION | | |
|---|---|---|---|---|
| | | 1 (LOW) | 2 (INTERMEDIATE) | 3 (HIGH) |
| | Fz < 60 | PASSIVE (RAISE HAND) | INDIRECT (RAISE HAND) | DIRECT (RAISE HAND) |
| | 80 < Fz | PASSIVE (LOWER HAND) | INDIRECT (LOWER HAND) | DIRECT (LOWER HAND) |
| | Fx < 100 | PASSIVE (MOVE HAND TO RIGHT) | INDIRECT (MOVE HAND TO RIGHT) | DIRECT (MOVE HAND TO RIGHT) |
| | 150 < Fx | PASSIVE (MOVE HAND TO LEFT) | INDIRECT (MOVE HAND TO LEFT) | DIRECT (MOVE HAND TO LEFT) |
| | Fy < 100 | PASSIVE (MOVE HAND FORWARD) | INDIRECT (MOVE HAND FORWARD) | DIRECT (MOVE HAND FORWARD) |
| | 130 < Fy | PASSIVE (MOVE HAND BACKWARD) | INDIRECT (MOVE HAND BACKWARD) | DIRECT (MOVE HAND BACKWARD) |
| | Fα < 30 | PASSIVE (TILT HAND RIGHTWARD) | INDIRECT (TILT HAND RIGHTWARD) | DIRECT (TILT HAND RIGHTWARD) |
| | 60 < Fα | PASSIVE (TILT HAND LEFTWARD) | INDIRECT (TILT HAND LEFTWARD) | DIRECT (TILT HAND LEFTWARD) |
| | Fβ < 30 | PASSIVE (TILT HAND FORWARD) | INDIRECT (TILT HAND FORWARD) | DIRECT (TILT HAND FORWARD) |
| | 60 < Fβ | PASSIVE (TILT HAND BACKWARD) | INDIRECT (TILT HAND BACKWARD) | DIRECT (TILT HAND BACKWARD) |
| | Fγ < 30 | PASSIVE (ROTATE HAND TO RIGHT) | INDIRECT (ROTATE HAND TO RIGHT) | DIRECT (ROTATE HAND TO RIGHT) |
| | 60 < Fγ | PASSIVE (ROTATE HAND TO LEFT) | INDIRECT (ROTATE HAND TO LEFT) | DIRECT (ROTATE HAND TO LEFT) |
| STATIONARY | OTHERS | PASSIVE (HOLD HAND STILL) | INDIRECT (HOLD HAND STILL) | DIRECT (HOLD HAND STILL) |
| NOT STATIONARY | - | INDIRECT (HOLD HAND STILL) | | |

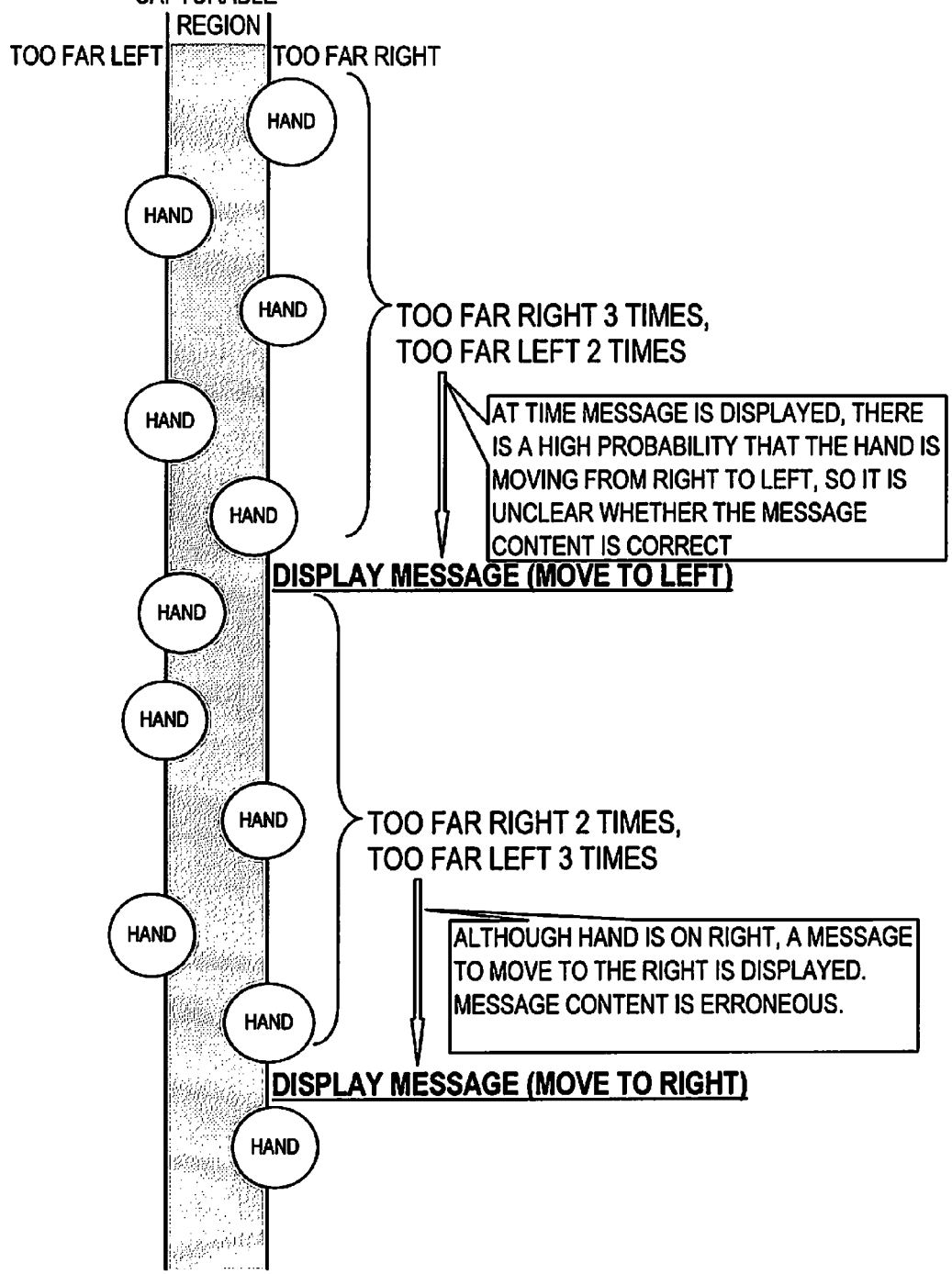

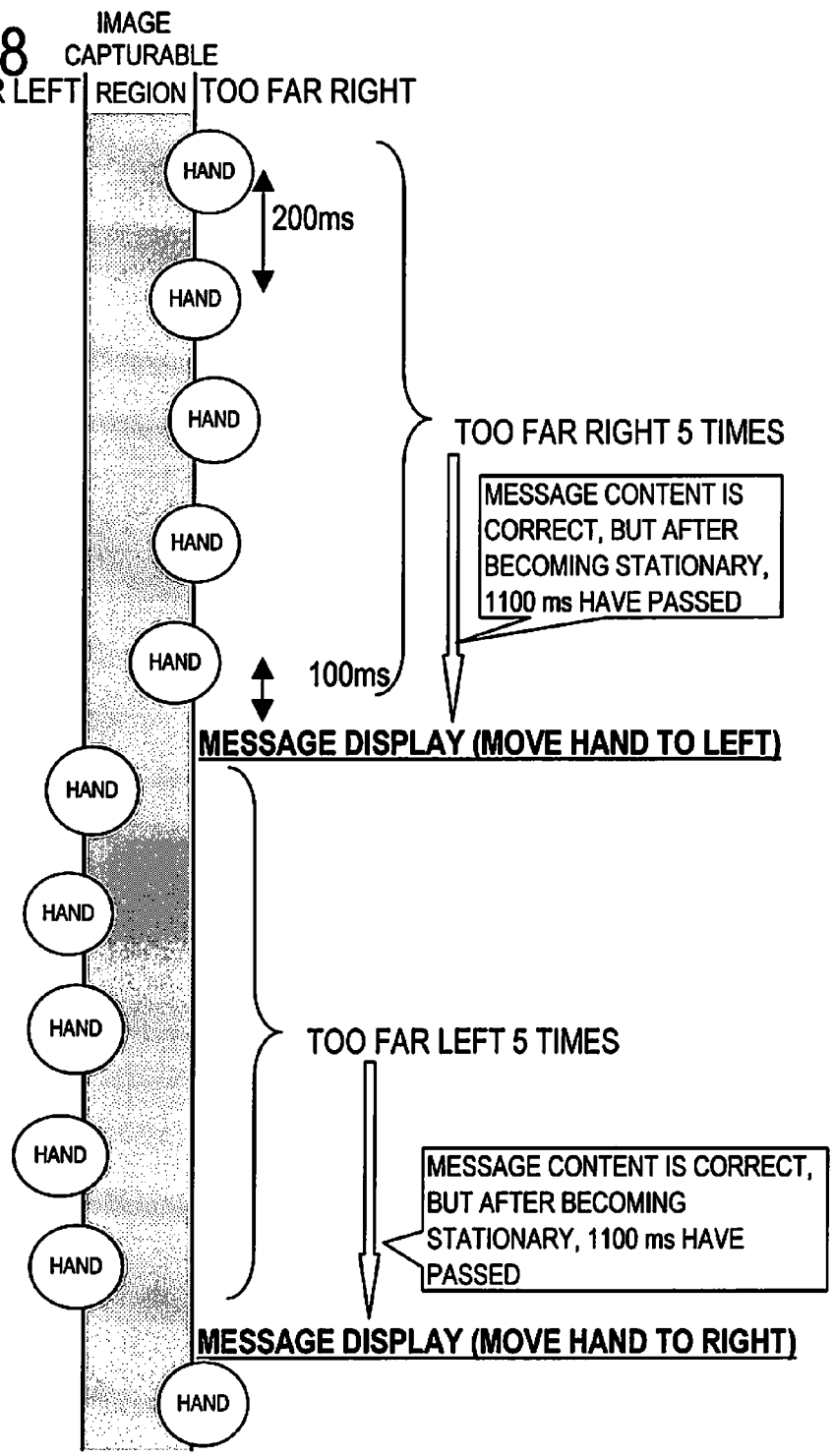

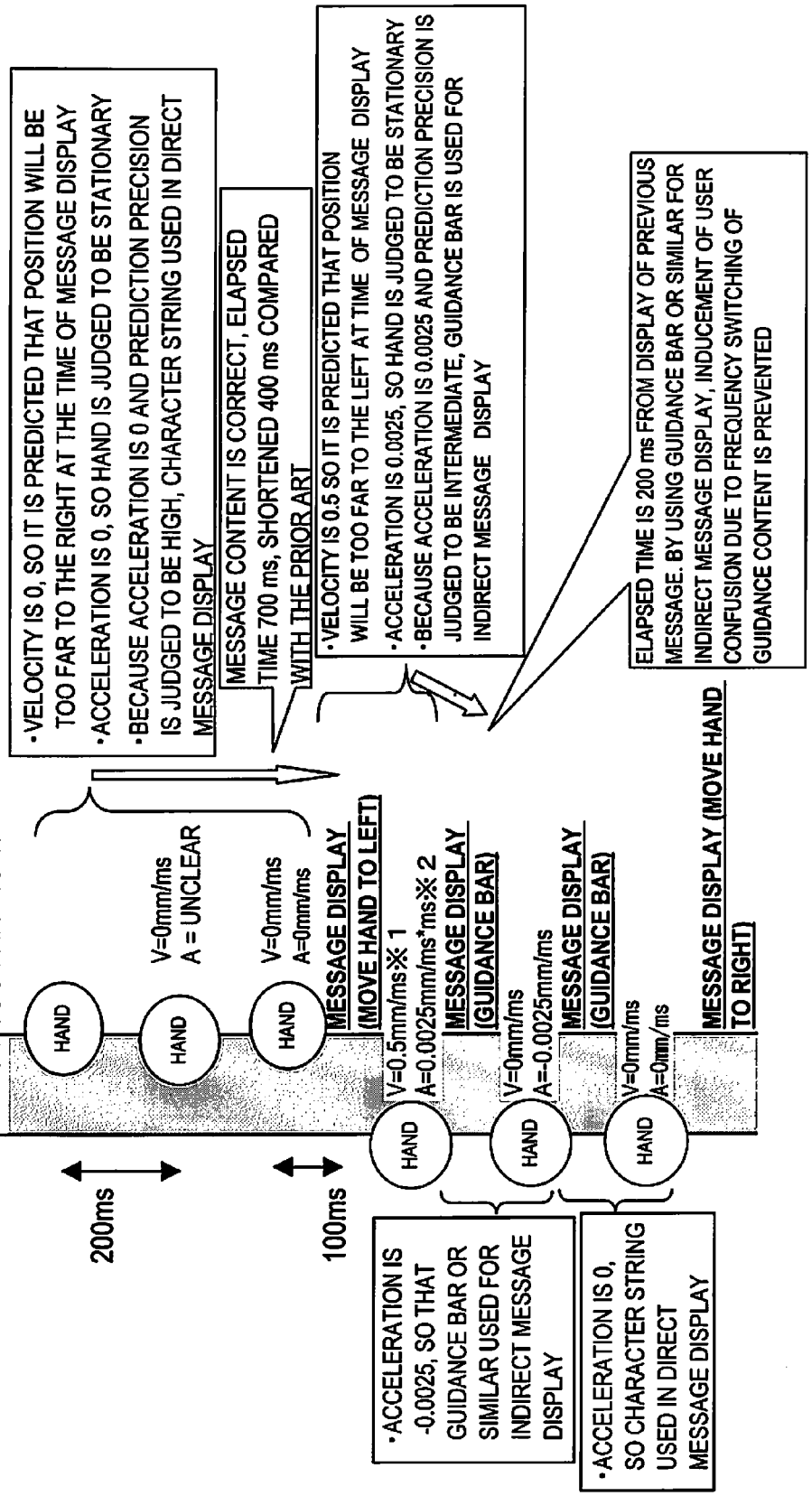

BODY PART GUIDANCE CONTROL METHOD FOR NON-CONTACT BIOMETRICS AUTHENTICATION DEVICE AND NON-CONTACT BIOMETRICS AUTHENTICATION DEVICE

CROSS-REFERENCE TO RELATED APPLICATIONS

This application is based upon and claims the benefit of priority of the prior Japanese Patent Application No. 2008-90560, filed on Mar. 31, 2008, the entire contents of which are incorporated herein by reference.

FIELD

This invention relates to a body part guidance control method for a non-contact biometrics authentication device which performs individual authentication utilizing characteristics of a body part which is a portion of a human body, and to a non-contact biometrics authentication device, and in particular relates to a body part guidance control method for a non-contact biometrics authentication device and to a non-contact biometrics authentication device in which, when detecting biometrics information without contact in order to perform verification against registered biometrics information, the body part to be detected is guided into a detection region.

BACKGROUND

There exist numerous portions of the human body, such as fingerprints and toeprints, retina patterns of the eyes, facial features, blood vessel patterns, and similar, enabling differentiation among human beings. With advances in biometrics technology in recent years, various devices have been provided which recognize features of body parts, which are such portions of the human body, and perform authentication of individuals.

For example, comparatively large quantities of individual characteristic data can be obtained from blood vessels in the palms and backs of the hands and the fingers as well as from palmprints, so that such data is useful to ensure reliability of individual authentication. In particular, the patterns of blood vessels (veins) remain unchanged from infancy throughout life, and are thought to be unique to each individual, making them appropriate for use in individual authentication. In such individual authentication devices, during registration or authentication, the user brings the palm of a hand close to an image capture device. The image capture device emits near-infrared rays, which are incident on the palm of the hand. The image capture device uses a sensor to receive near-infrared rays which have reflected from the palm of the hand.

Hemoglobin in the red corpuscles flowing in the veins has lost oxygen. This hemoglobin (reduced hemoglobin) absorbs near-infrared rays at wavelengths near 760 nanometers. Consequently when near-infrared rays are made incident on the palm of a hand, reflection amount is reduced only in the areas in which there are veins, and the intensity of the reflected near-infrared rays can be used to identify the positions of veins.

The user first uses an image capture device to register vein image data of the palm of his/her hand in a server or on a card. Then, in order to perform individual authentication, the user employs an image capture device to cause the vein image data of his/her hand to be read. The registered vein image retrieved using a user ID is verified against the vein pattern of the vein image for verification thus read, and individual authentication is performed (see for example Japanese Patent Laid-open No. 2004-062826 (FIG. 2 through FIG. 9)).

In detection of biometrics information without contact, the body part can freely move relative to the image capture device, and in particular the hand can be moved freely. On the other hand, the portion of the body for detection must be positioned within the region of image capture of the image capture device in order to enable precise detection. As such methods, when judging that a precise image capture may not be obtained by detected result of the hand position and orientation each time, a method has been proposed in which a display or voice is used to indicate that the hand position or orientation is inappropriate (see for example WO04/021884 (FIG. 3) and Japanese Patent Laid-open No. 2006-42880 (FIG. 11)). When using such methods, because there is no contact, accurate biometrics information can be detected even when performing detection in which there is no sense of resistance.

In non-contact detection of biometrics information, detection is performed without contact, and moreover the body part, and in particular the hand, moves freely. On the other hand, in order to perform biometrics authentication rapidly, numerous images must be captured, and appropriate images must be detected and output to the authentication process.

In the prior art, only past information for body part (hand) image capture is used to decide guidance messages, so that inappropriate messages are sometimes displayed while the user is moving the body part to the normal position. For example, in capture images of the palm of the hand as described above, a "please move your hand closer" message may be displayed while the hand is being brought close to the image capture region; or, a "please move to the right" message may be displayed while moving from the left to the right relative to the center of the image capture region.

Further, when the user moves his hand or other body part according to a displayed guidance message, there is the possibility that contradictory guidance messages are displayed in alternation, so that a situation occurs in which the user does not know how he should move his hand. For example, the messages "please move to the right", "please move to the left", "please move to the right" may be displayed in alternation, causing the user to become confused.

SUMMARY

Hence an object of this invention is to provide a body part guidance control method for a non-contact biometrics authentication device and a non-contact biometrics authentication device, to effectively guide a freely movable body part of the user to be detected into the image capture region of a non-contact image capture device.

A further object of the invention is to provide a body part guidance control method for a non-contact biometrics authentication device and a non-contact biometrics authentication device, to guide a body part into the image capture region of a non-contact image capture device without causing the user to become confused, even when the body part can be freely moved, and to shorten the image capture time.

Still a further object of the invention is to provide a body part guidance control method for a non-contact biometrics authentication device and a non-contact biometrics authentication device, to guide a body part into an image capture region without causing the user to become confused, to capture images of the body part in a position and state suitable for image capture.

To achieve the above-described objects, a non-contact biometrics authentication device according to the present invention, includes: an image capture device, which captures, without contact, images of a body part; a display device, which displays an image guiding operation of the image capture device for a user; and a control unit, which performs image capture operation of the image capture device, detects biometrics characteristic data from the captured images of the body part, and verifies the biometrics characteristic data against registered biometrics characteristic data. And the control unit detects, a plurality of times, positions of the body part using an output of the image capture operation of the image capture device performed a plurality of times, predicts the position of the body part at the time of output of a message according to the positions captured a plurality of times, decides a guidance message according to the predicted positions, and displays the guidance message on the display device.

Further, a body part guidance control method for a non-contact biometrics authentication device according to the present invention, includes the steps of: detecting, from an output of image capture operation of an image capture device performed a plurality of times, positions of the body part captured a plurality of times; predicting, from the positions captured the plurality of times, the position of the body part at the time of output of a message; deciding the guidance message according to the predicted position; and displaying the decided guidance message on a display device.

In the present invention, it is preferable that the control unit calculates a movement velocity of the body part from the positions captured the plurality of times, and predicts the position of the body part at the time of the message output from the final position of the positions captured the plurality of times and the calculated movement velocity.

In the present invention, it is preferable that the control unit calculates acceleration from the movement velocity, judges prediction precision of the body part predicted position from the acceleration, decides a guidance message according to the predicted position and the prediction precision, and displays the guidance message on the display device.

In the present invention, it is Preferable that the control unit judges whether the body part is stationary from the acceleration, decides the guidance message according to the predicted position, the prediction precision, and the stationary judgment result, and displays the guidance message on the display device.

In the present invention, it is preferable that the control unit detects the positions in each of a plurality of directions of the body part at the plurality of times from the output of image capture operation of the image capture device the plurality of times, predicts the positions in the plurality of directions of the body part at the time of message output from the positions in the plurality of directions the plurality of times, decides the guidance message according to the predicted positions in the plurality of directions, and displays the guidance message on the display device.

In the present invention, it is preferable that in the control unit, the positions in the plurality of directions are at least positions in two directions in the image capture plane of the image capture device.

In the present invention, it is preferable that in the control unit, the positions in the plurality of directions are at least positions in two directions in the image capture plane of the image capture device and the position in the direction perpendicular to the image capture plane.

In the present invention, it is preferable that in the control unit, the positions in the plurality of directions are at least positions in two directions in the image capture plane of the image capture device and the directions of inclination about the two directions.

In the present invention, it is preferable that the biometrics characteristic data is a pattern of the palm of a hand.

In the present invention, it is preferable that the control unit selectively displays bars in four directions of a screen of the display device as the guidance message.

Because n times of body part positions in past are used to predict the future position at the time of message display and the guidance message can be selected according to this position, an appropriate message can be output. Hence the time for guidance into an appropriate image capture region can be shortened, the output of messages for movement in the direction opposite the body part movement can be prevented, and inducement of confusion in the user can be prevented, so that the speed of authentication can be improved.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 7 explains position information acquisition processing in FIG. 4;

FIG. 8 explains a velocity table for transition state analysis processing in FIG. 4;

FIG. 9 explains an acceleration table for transition state analysis processing in FIG. 4;

FIG. 10 explains a prediction table for position information prediction processing in FIG. 4;

FIG. 11 explains a prediction precision judgment table for position information prediction processing in FIG. 4;

FIG. 12 explains a position information prediction table for position information prediction processing in FIG. 4;

FIG. 13 explains a stationary judgment table for stationary judgment processing in FIG. 4;

FIG. 15 explains an output information decision table for output method decision processing in FIG. 4;

FIG. 16 is a diagram for explaining a comparative guidance example of a case of hand movement;

FIG. 18 is a diagram for explaining a comparative guidance example of a case in which the hand is substantially stationary; and FIG. 19 is a diagram for explaining a guidance example of a case in which the hand is substantially stationary.

EMBODIMENTS

Below, embodiments of the invention are explained in the order of a biometrics authentication system, a guidance message output mechanism, body part guidance processing, and other embodiments.

(Biometrics Authentication System)

Figure 1:
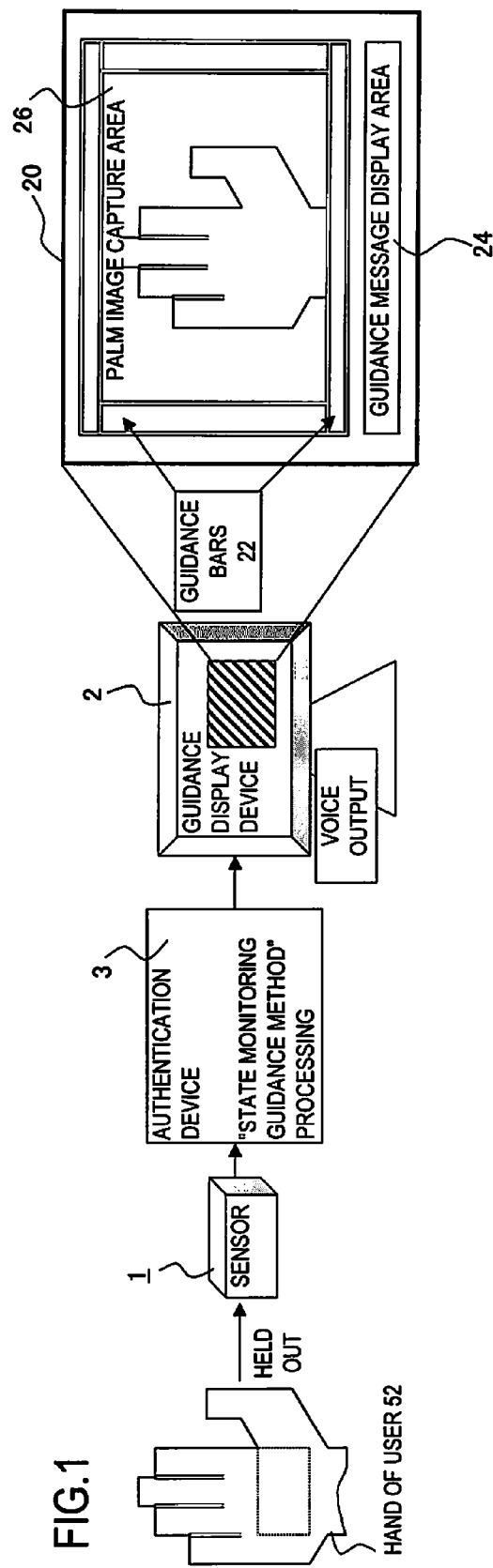
FIG. 1 is a configuration diagram of the biometrics authentication system of one embodiment of the invention.
Figure 2:
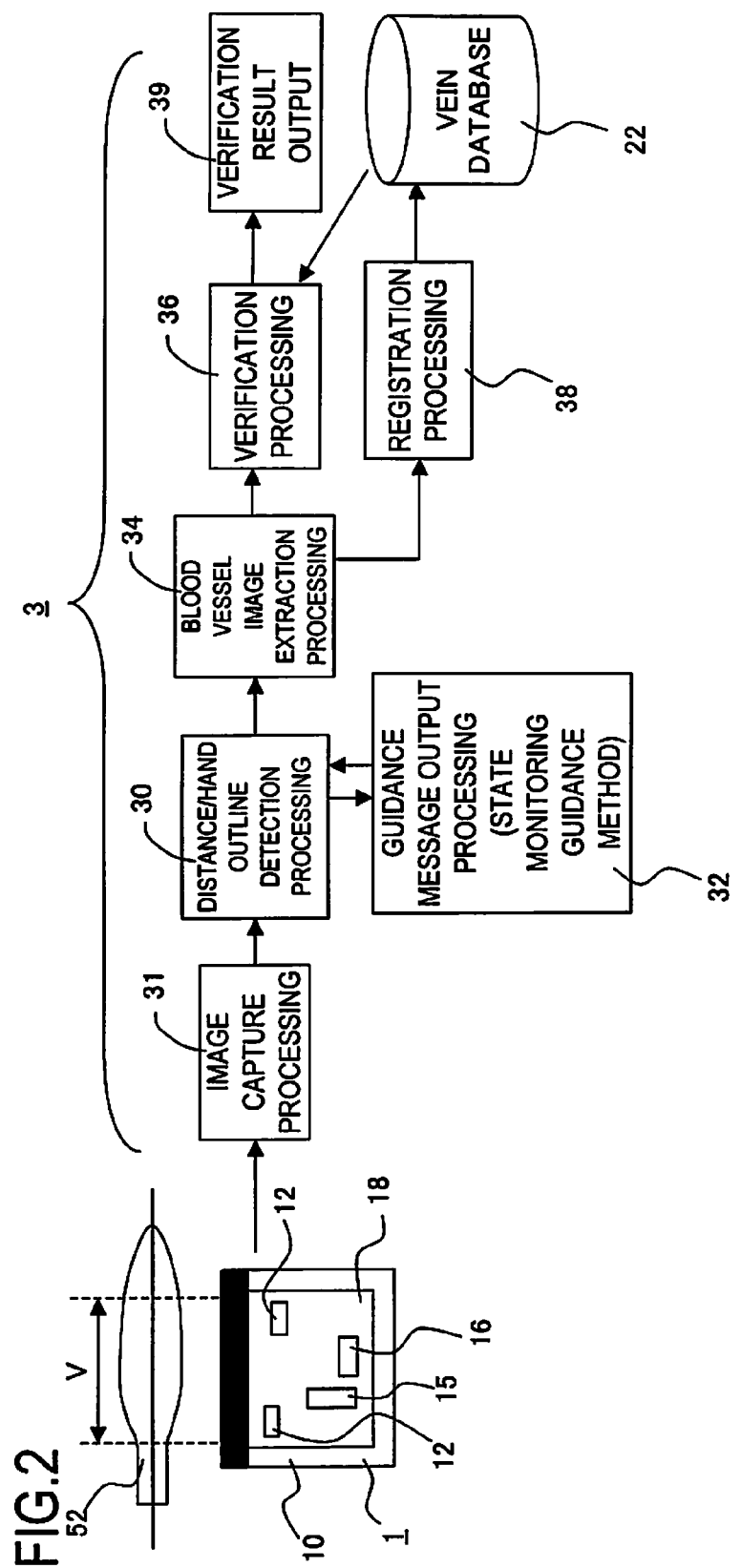
FIG. 2 is a block diagram of the biometrics authentication unit in FIG. 1.

FIG. 1 is a configuration diagram of the biometrics authentication system of one embodiment of the invention, and FIG. 2 is a block diagram of the biometrics authentication unit in FIG. 1. FIG. 1 shows an example of an authentication system using veins in the palm of the hand, used as a biometrics authentication system when logging on to a personal computer.

As shown in FIG. 1, a sensor (image capture device) 1 is connected to the personal computer 2. The image capture device 1 reads the vein pattern of the palm of a hand of the user, and outputs the read image to the authentication device 3. The authentication device 3 is installed as a program in the personal computer 2. Here, for purposes of explanation, the device is shown as a block separate from the personal computer 2.

When logging on, a palm guidance screen is displayed on the screen 20 of the personal computer 2. This screen 20 has a palm image capture display area 26, four guidance bars provided on the periphery thereof, and a guidance message display area 24 provided below the image capture display area 26.

The image capture device 1 and authentication unit 2 are explained using FIG. 2. As shown in FIG. 2, the palm image capture device 1 of FIG. 1 has a sensor unit 18 substantially in the center of the main unit 10. The sensor unit 18 is provided with an infrared sensor (CMOS sensor) and focusing lens 16 and a distance sensor 15 in the center; on the periphery thereof are provided a plurality of near-infrared light emission elements (LEDs) 12. For example, near-infrared light emission elements 12 are provided at eight places on the periphery, to emit near-infrared rays upwards. The readable region V of this sensor unit 18 is regulated by the relation between the sensor, focusing lens, and near-infrared light emission region.

When the hand 52 is opened and flat, the area of the palm is greatest, and moreover the palm is flat, so that when an image of the palm is captured by the sensor unit 18 in the image capture region V, the vein pattern is accurately obtained, and registration or verification can be performed effectively. When the distance from the sensor unit 18 to the palm is within a prescribed range, a sharp focused image is obtained from the sensor 16 of the sensor unit 18.

Hence there is a need to guide the hand of the user such that the position, inclination, and height of the palm above the sensor unit 18 are precise with respect to the image capture region of the sensor unit 18.

The authentication device (program) 3 executes the series of verification processing 30 to 39. The personal computer 2 has, for example, a CPU, various types of memory, an interface circuit, and other circuits necessary for data processing. The CPU executes the series of verification processing 30 to 39.

The image capture processing 31 performs image capture at fixed intervals in the image capture device 1. A distance/hand outline detection processing 30 receives the distance measured by the distance sensor 14 from the image capture device 1, judges whether the user's palm is being held out, and when judging that the user's hand is being held out, captures images of the hand at fixed intervals in a plural times. And the distance/hand outline detection processing 30 detects the distances from images captured by the sensor unit 18 to three points on the hand, detects the outline from these images, and detects the hand position, height, and inclination. Further, the distance/hand outline detection processing 30 judges whether or not the hand position, height, and inclination is appropriate, and out put the image to blood vessel image extraction processing 34 when judging that that is appropriate.

As explained below using FIG. 3, guidance message output processing 32, when the distance measured by the distance sensor 16 indicates that the hand is outside the image capture range, or when the image cannot be used in registration and verification processing, outputs to a screen of the personal computer 2 a message to guide the palm to the left or right, forward or backward, upward or downward. By this means, the image capture device 1 guides the palm of the hand held out by the user.

Blood vessel image extraction processing 34 extracts a vein image from the image of the hand when hand outline detection processing 30 judges that an image has been captured with the hand held correctly. The blood vessel image registration processing 38 registers the extracted blood vessel image in the vein database (in memory of the personal computer 2) 22. Verification processing 36 retrieves registered blood vessel data from the vein database 22, and compares blood vessel image data detected by blood vessel detection processing 34 with the registered blood vessel image data to perform verification processing. Verification result output processing 39 outputs the verification result to the login program of the personal computer 2.

In such a non-contact authentication system, the above-described guidance messages are convenient for the user, and are effective in facilitating operations by a user not familiar with the authentication system and in speeding authentication.

(Guidance Message Output Mechanism)

Figure 3:
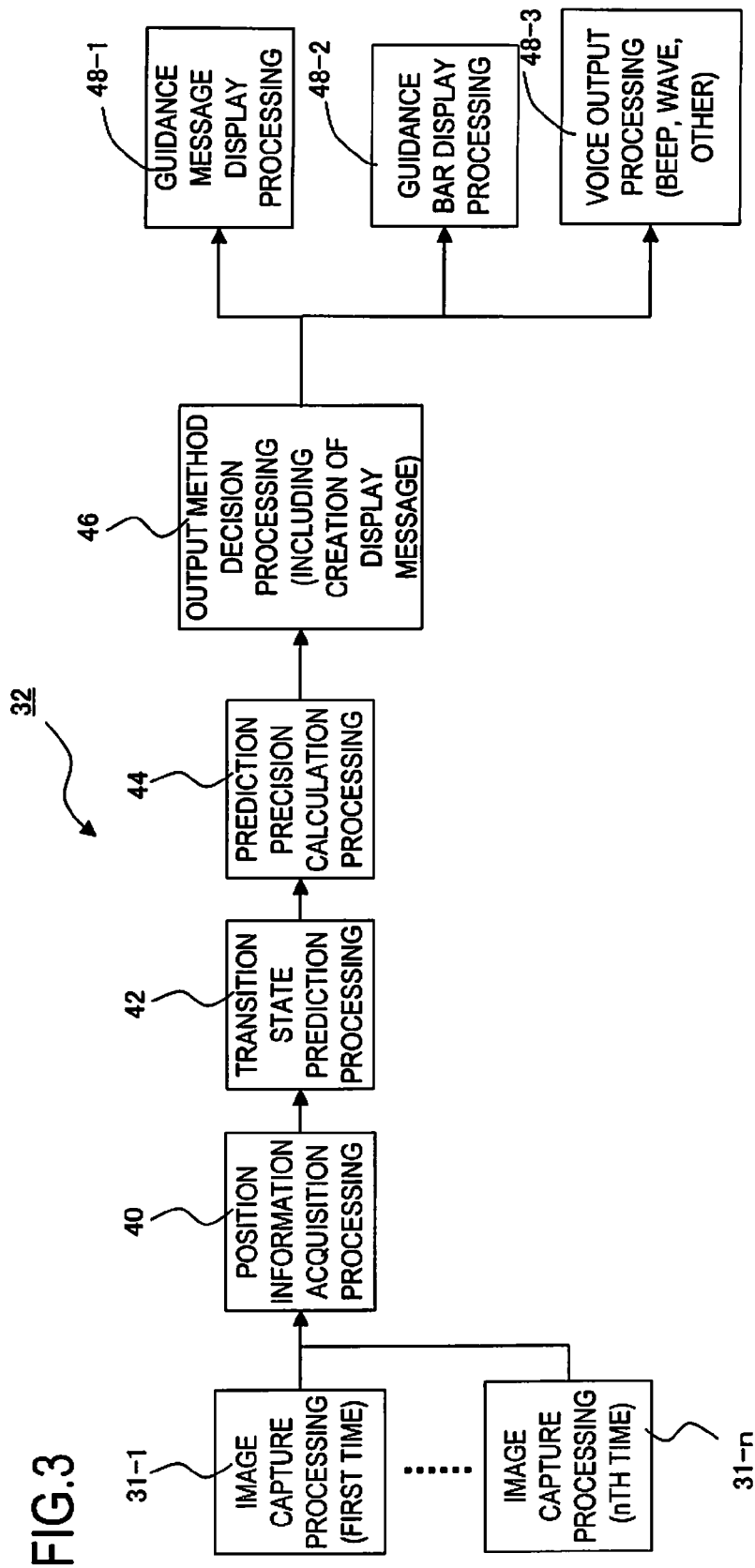
FIG. 3 is a block diagram of the guidance message output processing of FIG. 2.

Next, the guidance message output processing 32 of FIG. 2 is explained in detail using FIG. 3.

As shown in FIG. 3, when it is judged that the user's hand is held out correctly, position information acquisition processing 40 acquires the position, height, and inclination of the hand from images captured a plurality of times at fixed intervals.

Transition state prediction processing 42 calculates the direction, speed, and acceleration of movement from differences in the positions, heights, and inclinations in the plurality of continuous captured images, and predicts the position and state (height, inclination) of the hand at the time of message display.

Prediction precision calculation processing 44 judges whether the user's hand is stationary, about to be stationary, or is moving from the direction, speed, and acceleration of movement of the hand, and calculates the precision of the prediction of the hand position according to the judgment result.

Output method decision processing 46 selects the message output method based on the predicted position of the hand at the time of message display and the precision of the hand position prediction. For example, when the prediction precision is high, a message indicating the movement direction of the hand is displayed by the guidance message display processing 48-1, to give clear guidance. Conversely, when the precision of prediction is low, guidance bar display processing 48-2 or voice output processing 48-3 causes a beeping sound to be emitted or a guidance bar to be displayed, to provide supplementary guidance.

These processing routines 40 to 48-1, 48-2, and 48-3 are repeated to guide the user's hand to a position suitable for image capture.

(Body Part Guidance Processing)

Figure 4:
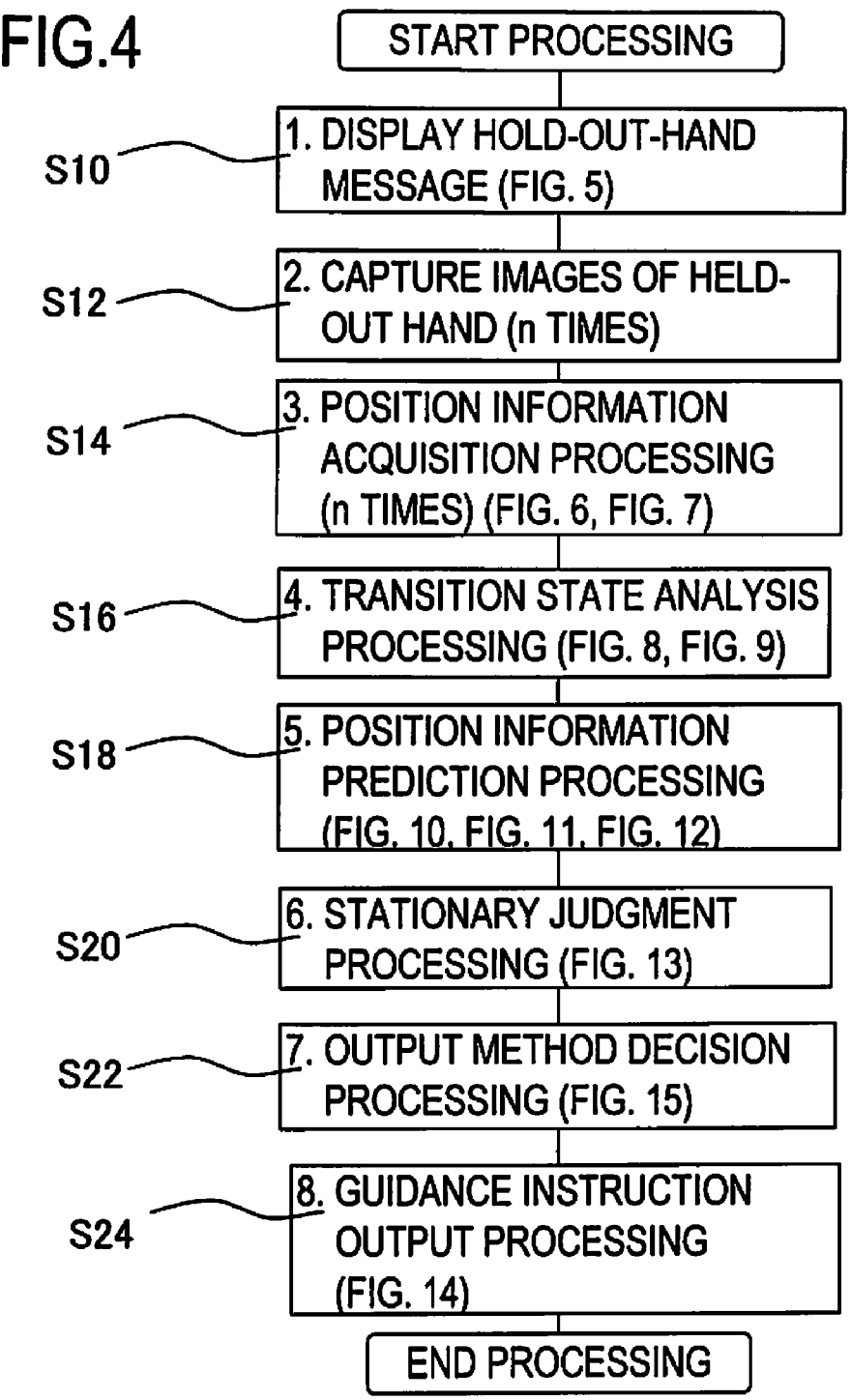
FIG. 4 shows the flow of guidance message output processing.

Next, details of the guidance processing of FIG. 3 are explained. FIG. 4 shows the flow of guidance message output processing, FIG. 5 explains processing to display messages relating to holding out of the hand in FIG. 4, FIG. 6 explains detection coordinates in FIG. 4, FIG. 7 explains position information acquisition processing in FIG. 4, FIG. 8 explains a velocity table for transition state analysis processing in FIG. 4, FIG. 9 explains an acceleration table for transition state analysis processing in FIG. 4, FIG. 10 explains a prediction table for position information prediction processing in FIG. 4, FIG. 11 explains a prediction precision judgment table for position information prediction processing in FIG. 4, FIG. 12 explains a position information prediction table for position information prediction processing in FIG. 4, FIG. 13 explains a stationary judgment table for stationary judgment processing in FIG. 4, FIG. 14 explains guidance instruction output processing in FIG. 4, and FIG. 15 explains an output information decision table for output method decision processing in FIG. 4.

Below, the guidance message output processing of FIG. 4 is explained, referring to FIG. 5 through FIG. 15.

Figure 5:
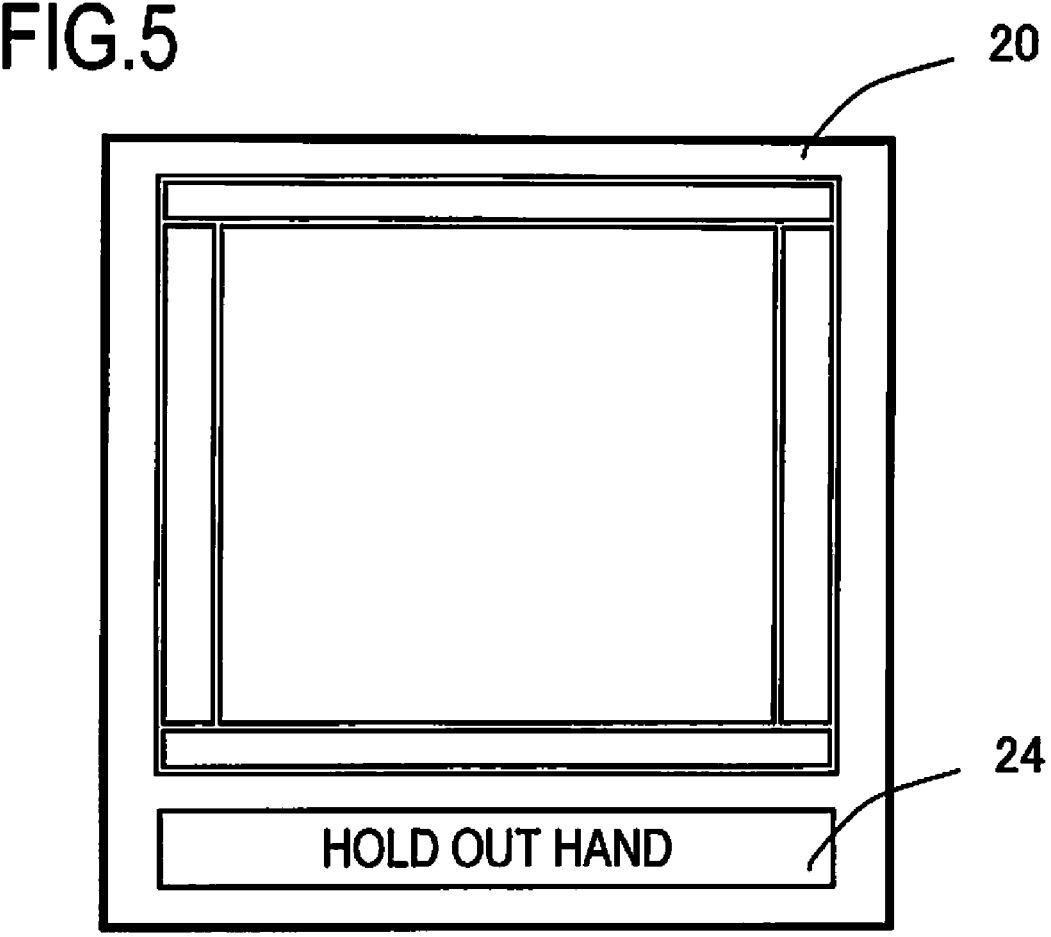
FIG. 5 explains processing to display messages relating to holding out of the hand in FIG. 4.

(S10) The hand holding-out message shown in FIG. 5 is displayed on the screen 20. Here, a message prompting the user to hold out his hand is displayed in the guidance message display area 24 of the screen 20.

(S12) Images to acquire position information for the held-out hand are acquired N times from the image capture device 1. Here, three images are captured.

Figure 6:
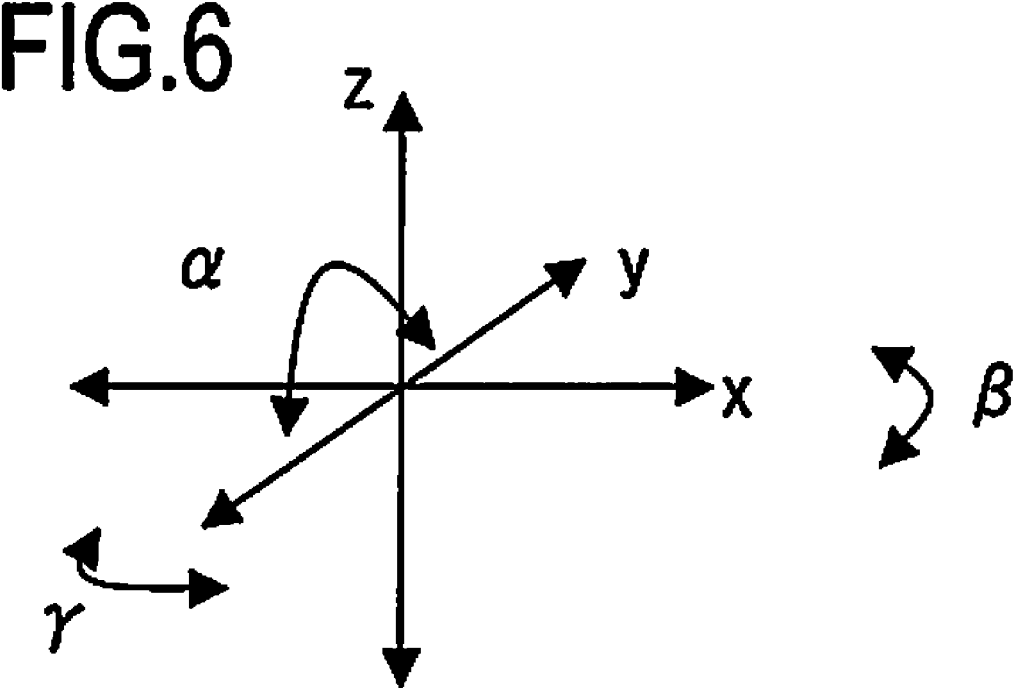
FIG. 6 explains detection coordinates in FIG. 4.

(S14) From images captured in a state in which the hand is held out, the distance (z), position (x, y), and inclination ($\alpha$, $\beta$, $\gamma$) relative to the center position of the sensor unit 18 are stored in the position information table 32-1 of FIG. 7. Here, as shown in FIG. 6, the distance z is the distance from the sensor unit 18 to the palm; the position (x, y) is the position of the center of the palm in the plane taking the center position of the sensor unit 18 to be the center; and the inclination ($\alpha$, $\beta$, $\gamma$) is the inclination of the palm about the x, y, and z axes. Also, the position coordinates table 32-1 stores the distances (z), positions (x, y), and inclinations ($\alpha$, $\beta$, $\gamma$) for each of the n (=3) images.

(S16) Next, transition stage analysis processing is performed. That is, from the distances z1 to zn for n (=3) image captures and the image capture interval t taken from the position information table 32-1, the z-direction movement velocity Vz and acceleration Az are calculated. From the horizontal positions xl to xn for n image captures and the image capture interval t, the x-direction movement velocity Vx and acceleration Ax are calculated. And from the vertical positions yl to yn for n image captures and the image capture interval t, the y-direction movement velocity Vy and acceleration Ay are calculated.

From the vertical inclinations al to $\alpha$n for n image captures and the image capture interval t, the $\alpha$-direction movement velocity V$\alpha$ and acceleration A$\alpha$ are calculated. From the vertical inclinations $\beta$1 to $\beta$n for n image captures and the image capture interval t, the $\beta$-direction movement velocity V$\beta$ and acceleration A$\beta$ are calculated. And from the vertical inclinations $\gamma$1 to $\gamma$n for n image captures and the image capture interval t, the $\gamma$-direction movement velocity V$\gamma$ and acceleration A$\gamma$ are calculated.

Each movement velocity is stored in the transition state table (velocity) 32-2 in FIG. 8 and each acceleration is stored in the transition state table (acceleration) 32-3 in FIG. 9. If the position acquisition in FIG. 7 is set at every 200 ms, storage thereof is made by converting it into velocity (position difference) per 1 ms in FIG. 8, and acceleration (veracity difference) per 1 ms is stored in FIG. 9.

(S18) Position information prediction processing is performed. That is, from the positions and velocities in each direction, the predicted position information Fx, Fy, Fz, F$\alpha$, F$\beta$, F$\gamma$ in each direction at the time (in the future) of message display is calculated. Here, predicted positions 100 ms after the time of the third image capture are calculated from the positions obtained from the third image captured in FIG. 7 and the velocities of FIG. 8 to predict the position after 100 ms have elapsed, and the predicted position is stored in the position information prediction table 32-4 of FIG. 10. Next, the precision of the calculated predicted position is calculated from the acceleration.

That is, as shown in FIG. 11, a prediction precision judgment table 32-5 of prediction precision (high, intermediate, low) for the acceleration values Ax, Ay, Az, A$\alpha$, A$\beta$, A$\gamma$ in each direction is prepared. This judgment table 32-5 is a table which classifies prediction precision, with small acceleration resulting in small fluctuation so that prediction precision is high, large acceleration resulting in large fluctuation so that prediction precision is low, and intermediate acceleration resulting in intermediate fluctuation, so that prediction precision is intermediate.

Hence the prediction precision of the prediction precision judgment table 32-5 is referenced using the accelerations of the table 32-3 of FIG. 9, the prediction precisions are decided, and the results are stored in the prediction precision column for each of the directions in the prediction information prediction table 32-4, as in FIG. 12.

(S20) Next, stationary judgment processing is performed. From the acceleration, a judgment as to whether the hand is stationary (or the hand is about to be stationary) is made. That is, as shown in FIG. 13, a stationary judgment table 32-6 for stationary and non-stationary acceleration values in each direction Ax, Ay, Az, A$\alpha$, A$\beta$, A$\gamma$ is prepared. This judgment table 32-6 is a table which classifies acceleration values, with small acceleration values resulting in little fluctuation and a stationary state, and large acceleration values resulting in large acceleration and a non-stationary state. Hence the accelerations of table 32-3 in FIG. 9 are used to reference the stationary judgment table 32-6 and judge whether states are stationary or non-stationary states.

(S22) Next, output method decision processing is performed. That is, from stationary judgments, predicted positions, and prediction precisions, the guidance message output method is decided. First, as shown in FIG. 15, the an output information decision table 32-7 is prepared indicating guidance output methods for the three parameters which are the stationary judgment result, predicted position, and prediction precision.

This table 32-7 indicates that, when in a non-stationary state, a "hold hand still" message is output regardless of the predicted position or the prediction precision. In a stationary state, when fluctuations are small a message is output according to the movement direction. For example, if the predicted position in the z direction is greater than a stipulated range (here, 60 to 80 mm), a "lower your hand" message is output, and if less than the stipulated range, a "raise your hand" message is output. Further, the message intensity is classified as direct, indirect, and passive, according to the prediction precision (high, low, intermediate).

Figure 14:
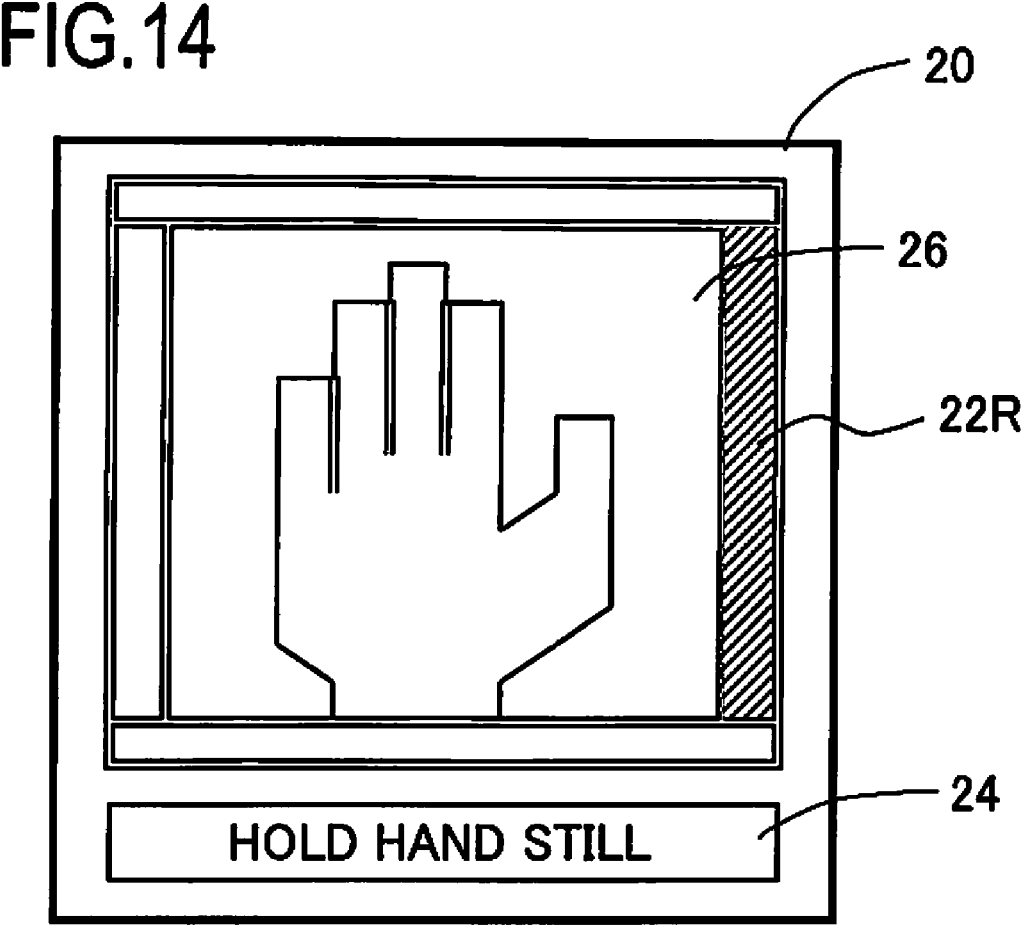
FIG. 14 explains guidance instruction output processing in FIG. 4.

(S24) Then, guidance instruction output processing is performed. That is, message display/guidance bar display/voice output is performed, according to the output method decided by the output method decision processing of step S22. For example, in the case of the predicted positions and prediction precisions for each direction of position information prediction table 32-4 in FIG. 12, the x direction is in the non-stationary state, and the state is judged to be stationary in directions other than the x direction, as indicated in FIG. 13. From these predicted positions, prediction precisions, and stationary judgment results, referring to the table of FIG. 15, "hold hand still" is displayed, as shown in FIG. 14, in the guidance message display area 24, and the right-side guidance bar 22R is displayed as a passive indicator (hand to the right).

For example, the message intensity may be indicated by the color of the guidance bar, with red used as a direct indication, yellow used as an indirect indication, and blue as a passive indication.

In this way, velocities and accelerations are calculated from palm positions of n times in the past, the future position at the time of message display is predicted, and the guidance message is selected according to this position, so that appropriate messages can be output. As a result, the time for guiding into the optimum image capture region can be shortened, and moreover output of messages indicating directions opposite the direction of hand movement can be prevented, so that inducement of confusion in the user can be avoided.

Further, accelerations are used to decide prediction precisions and messages are selected, so that a stronger or weaker message can be output to the user according to the precision, and the user can be made aware of the degree of guidance being provided.

Next, FIG. 16 through FIG. 19 are used to explain the advantageous results of guidance. In FIG. 16 through FIG. 19, for simplicity of explanation, an example is explained in which the center is the position at which image capture is successful (possible), and the hand position is shifted only to the left or right of this.

Figure 17:
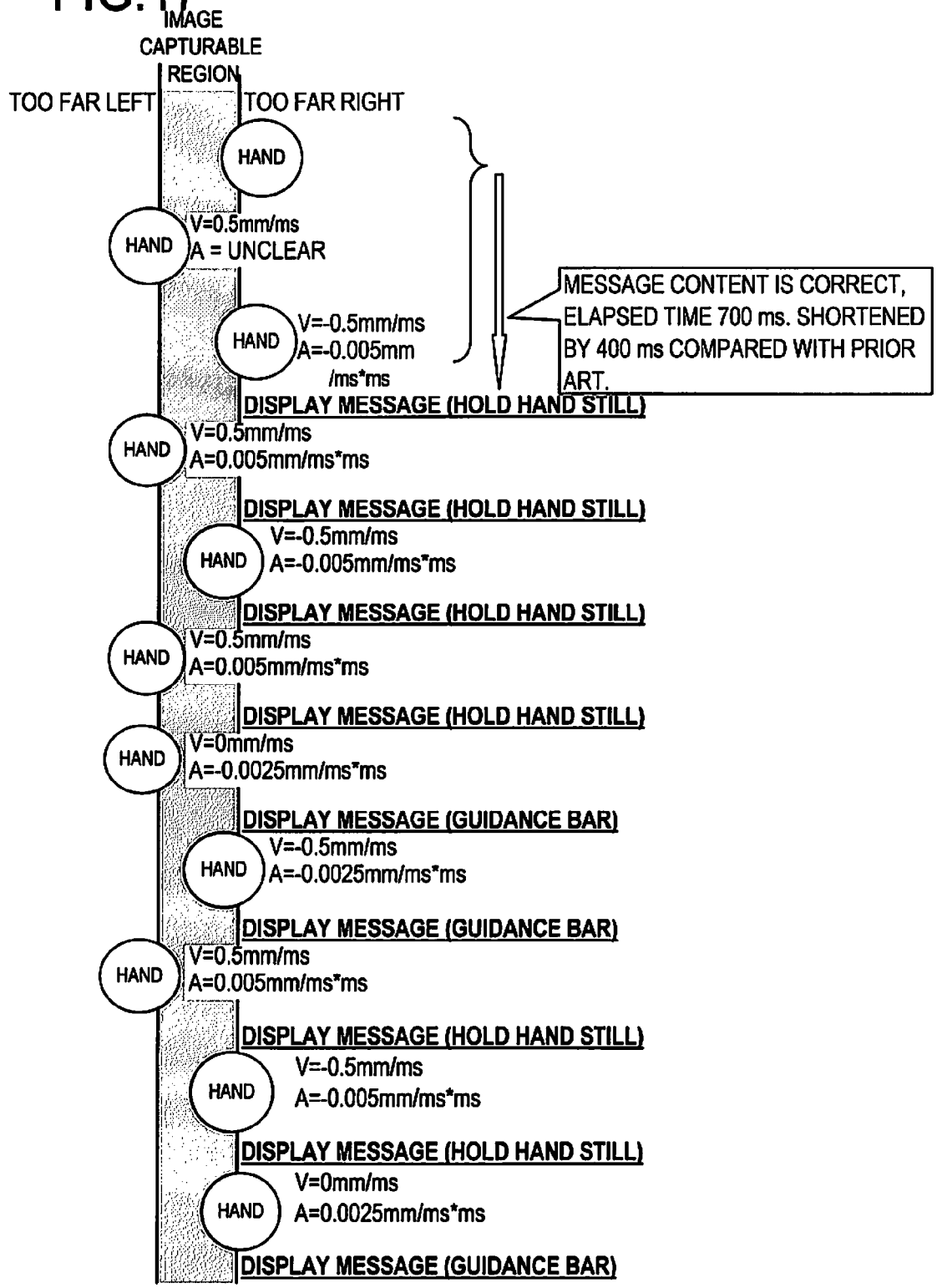
FIG. 17 is a diagram for explaining a guidance example of a case of hand movement according to the present invention.

FIG. 16 and FIG. 17 show a case of hand movement; FIG. 16 is a guidance example for Japanese Patent Laid-open No. 2006-42880 (FIG. 11), and FIG. 17 is a guidance example according to this invention. In FIG. 16, messages are output based on five deviation judgment results, so that when the hand is shifted to the left or right relative to the image capture success position, if the hand is too far right three times and too far left two times, the message is "move to the left", or the direction opposite the more frequent shift direction. However, the message displayed is for the direction opposite the direction of most frequent shifts in the past, so that when the message is output, it is unclear in which direction the hand is moving, and it is unclear whether the message is correct, and in some cases the message may be erroneous.

On the other hand, in the example of FIG. 17, the predicted position at the time of message output is used to select the message, so that the message content matches with the hand movement, and the correct message can be output. Hence the hand can be guided in a short amount of time to the image capture success position.

FIG. 18 and FIG. 19 show a case in which the hand is substantially stationary; FIG. 18 is an example of guidance for Japanese Patent Laid-open No. 2006-42880 (FIG. 11), and FIG. 19 is a guidance example according to this invention. In FIG. 18, when the hand is shifted to the right relative to the image capture success position, if a shift too far to the right is detected five times, the message is "move to the left", in the opposite direction. However, because the message is for the direction opposite a cumulative number of shifts in the past, time is required until the message is output.

On the other hand, in the example of FIG. 19, the predicted position, velocity, and acceleration at the time of message output are used to select the message, so that the correct message agreeing with the hand movement can be output in a short length of time. Hence the time to guide the hand to the image capture success position is shortened.

OTHER EMBODIMENTS

In the above-described embodiments, non-contact biometrics authentication was explained for authentication of the vein pattern of the palm of the hand; but application to the vein pattern of fingers, to authentication of palmprints or other characteristics of the palm of the hand, to authentication of fingerprints, facial features, or other body part authentication, is also possible. In addition, an example was explained of login to a computer, but application to automated equipment for financial tasks, to automated equipment in other fields such as automated vending machines, to the opening and closing of doors requiring individual authentication, to tasks in which authentication is used in place of keys, and similar is also possible.

Further, messages may be selected using only position prediction processing, without using prediction precision; and the message output method is not limited to message display and guidance bar display, but may be a message only, or a guidance bar only, or some other appropriate output mode.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:
1. A non-contact biometrics authentication device, comprising:
an image capture device, which captures, without contact, images of a body part;
a display device, which displays an image guiding operation of the image capture device for a user; and
a control unit, which performs image capture operation of the image capture device, detects biometrics characteristic data from the captured images of the body part, and verifies the biometrics characteristic data against registered biometrics characteristic data,
wherein the control unit detects, a plurality of times, positions of the body part using an output of the image capture operation of the image capture device performed a plurality of times, calculates a movement velocity of the body part from the positions captured the plurality of times, calculates a predict position of the body part at the time of output of a message according to a final position of the positions captured the plurality of times and the movement velocity, calculates acceleration from the movement velocity, judges prediction precision of the predict position from the acceleration, decides a guid- ance message according to the predict position and the prediction precision, and displays the guidance message on the display device.

2. The non-contact biometrics authentication device according to claim 1, wherein the control unit judges whether or not the body part is stationary from the acceleration, decides the guidance message according to the predicted position, the prediction precision, and a stationary judgment result, and displays the guidance message on the display device.

3. The non-contact biometrics authentication device according to claim 1, wherein the control unit detects the positions in two directions in the image capture plane of the image capture device and the position in the direction perpendicular to the image capture plane as the positions in the plurality of directions.

4. The non-contact biometrics authentication device according to claim 1, wherein the control unit detects the positions in two directions in the image capture plane of the image capture device and the directions of inclination about the two directions as the positions in the plurality of directions.

5. The non-contact biometrics authentication device according to claim 1, wherein the biometrics characteristic data is a pattern of the palm of a hand.

6. The non-contact biometrics authentication device according to claim 1, wherein the control unit selectively displays bars in four directions of a screen of the display device as the guidance message.

7. A non-contact biometrics authentication device, comprising:
an image capture device, which captures, without contact, images of a body part;
a display device, which displays an image guiding operation of the image capture device for a user; and
a control unit, which performs image capture operation of the image capture device, detects biometrics characteristic data from the captured images of the body part, and verifies the biometrics characteristic data against registered biometrics characteristic data,
wherein the control unit detects the positions in each of a plurality of directions of the body part at a plurality of times from the output of image capture operation of the image capture device the plurality of times, calculates predict positions in the plurality of directions of the body part at a time of message output from the positions in the plurality of directions the plurality of times, decides the guidance message according to the predict positions in the plurality of directions, and displays the guidance message on the display device.

8. A non-contact biometrics authentication device, comprising:
an image capture device, which captures, without contact, images of a body part;
a display device, which displays an image guiding operation of the image capture device for a user; and
a control unit, which performs image capture operation of the image capture device, detects biometrics characteristic data from the captured images of the body part, and verifies the biometrics characteristic data against registered biometrics characteristic data,
wherein the control unit detects, a plurality of times, positions in at least two directions which are parallel to an image capture plane of the image capture device from outputs of image capture operation of the image capture device, calculates predict positions in the two directions of the body part at the time of message output from the detected positions of the two directions, decides a guidance message for returning the body part to a center of the image capture plane of the image capture device according to the predicted positions in at least two directions, and displays the guidance message on the display device.

9. A body part guidance control method for a non-contact biometrics authentication device, which captures images of a body part without contact, detects biometrics characteristic data from the captured images and verifies the detected biometrics characteristic data against previously registered biometrics characteristic data to perform individual authentication, the method comprising:
detecting, from an output of image capture operation of an image capture device performed a plurality of times, positions of the body part captured a plurality of times;
calculating a movement velocity of the body part from detected positions;
calculating, from the positions captured the plurality of times, a predict position of the body part at the time of output of a message from a final position of the positions captured a plurality of times and the movement velocity;
calculating acceleration from the movement velocity;
judging prediction precision of the predict position from the acceleration;
deciding a guidance message according to the predict position and the prediction precision; and
displaying the decided guidance message on a display device.

10. The body part guidance control method of a non-contact biometrics authentication device according to claim 9, the method further comprising judging whether the body part is stationary from the acceleration,
wherein the deciding comprises deciding the guidance message according to the predicted position, the prediction precision and the stationary judgment result.

11. A body part guidance control method of a non-contact biometrics authentication device, which captures images of a body part without contact, detects biometrics characteristic data from the captured images and verifies the detected biometrics characteristic data against previously registered biometrics characteristic data to perform individual authentication, the method comprising:
detecting, from an output of image capture operation of an image capture device performed a plurality of times, positions of the body part captured a plurality of times;
calculating, from the positions captured the plurality of times, a predict position of the body part at the time of output of a message according to the positions captured a plurality of times;
deciding a guidance message according to the predict position; and
displaying the decided guidance message on a display device,
wherein the calculating of the predict position comprises predicting the positions in a plurality of directions of the body part at the time of message output from each of the positions in a plurality of directions of the body part captured a plurality of times, detected from the output of image capture operation of the image capture device performed a plurality of times,
and the deciding comprises deciding the guidance message according to the predicted positions in a plurality of directions.

12. A body part guidance control method of a non-contact biometrics authentication device, which captures images of a body part without contact, detects biometrics characteristic data from the captured images and verifies the detected biometrics characteristic data against previously registered biometrics characteristic data to perform individual authentication, the method comprising:

detecting, from outputs of image capture operation of an image capture device performed a plurality of times, positions, which are parallel to an image capture plane of the image capture device, of the body part captured a plurality of times;

calculating, from the positions captured the plurality of times, a predict position of the body part at the time of output of a message according to the positions captured a plurality of times;

deciding a guidance message according to the predict position; and displaying the decided guidance message on a display device;

wherein the calculating of the predict position comprises calculating the positions in the two directions in the image capture plane of the image capture device, and the deciding comprises deciding the guidance message for returning the body part to a center of the image capture plane of the image capture device according to the predicted positions in at least two directions.

13. The body part guidance control method of a non-contact biometrics authentication device according to claim 9, wherein the calculating of the predict position comprises predicting the positions in the two directions in the image capture plane of the image capture device and the position in the direction perpendicular to the image capture plane.

14. The body part guidance control method of a non-contact biometrics authentication device according to claim 9, wherein the calculating of the predict position comprises predicting at least the positions in the two directions in the image capture plane of the image capture device and the directions of inclination about the two directions.

15. The body part guidance control method of a non-contact biometrics authentication device according to claim 9, wherein the characteristic data of the body part is a pattern of the palm of a hand.

16. The body part guidance control method of a non-contact biometrics authentication device according to claim 9, wherein the displaying comprises selectively displaying bars in four directions of a screen of the display device as the guidance message.

* * * * *